US012747793B2

(12) United States Patent
Kimura et al.

(10) Patent No.: US 12,747,793 B2
(45) Date of Patent: Sep. 29, 2026

(54) SHUT-OFF VALVE, VACUUM PUMP SYSTEM, AND VACUUM PUMP

(71) Applicant: SHIMADZU CORPORATION, Kyoto (JP)

(72) Inventors: Hiroaki Kimura, Kyoto (JP); Masahito Kogame, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 199 days.

(21) Appl. No.: 18/406,307

(22) Filed: Jan. 8, 2024

(65) Prior Publication Data

US 2024/0288075 A1 Aug. 29, 2024

(30) Foreign Application Priority Data

Feb. 28, 2023 (JP) ................................. 2023-030163

(51) Int. Cl.
*F16K 1/30* (2006.01)
*F04D 19/04* (2006.01)

(52) U.S. Cl.
CPC ............ *F16K 1/301* (2013.01); *F04D 19/042* (2013.01)

(58) Field of Classification Search
None
See application file for complete search history.

(56) References Cited

U.S. PATENT DOCUMENTS 3,369,476 A * 2/1968 Seiz ...................... F16K 17/006 454/902
3,794,077 A * 2/1974 Fanshier ................. F16K 17/30 137/513.3
9,383,031 B2 * 7/2016 Shelcoviz ............. F16K 15/063
2009/0047142 A1 * 2/2009 Hozumi .................. F04C 25/02 417/244
2013/0259712 A1 * 10/2013 Kawasaki ............... F04D 25/16 417/201
2015/0000748 A1 * 1/2015 Shelcoviz ........... F16K 37/0075 137/511

FOREIGN PATENT DOCUMENTS

JP 2013-167207 A 8/2013

* cited by examiner

*Primary Examiner* — Dominick L Plakkoottam
*Assistant Examiner* — Geoffrey S Lee
(74) *Attorney, Agent, or Firm* — Renner, Otto, Boisselle & Sklar, LLP

(57) ABSTRACT

A shut-off valve 1 is a shut-off valve arranged on the downstream side with respect to an exhaust port of a vacuum pump, and includes a valve seat, a valve element, and a pressure receiving portion. The valve element is arranged on the downstream side with respect to the valve seat, and is configured movable so as to contact the valve seat or separate from the valve seat. The pressure receiving portion is arranged on the downstream side with respect to the valve element, and is movable to the valve seat by receiving the pressure of gas flowing back to the valve seat. The valve element is connected to the pressure receiving portion, and moves to the valve seat along with movement of the pressure receiving portion to the valve seat.

7 Claims, 11 Drawing Sheets

SHUT-OFF VALVE, VACUUM PUMP SYSTEM, AND VACUUM PUMP

CROSS-REFERENCE TO RELATED APPLICATIONS

This application claims priority under 35 U.S.C § 119 to Japanese Patent Application No. 2023-030163 filed on Feb. 28, 2023. The entire disclosure of Japanese Patent Application No. 2023-030163 is hereby incorporated herein by reference.

BACKGROUND OF THE INVENTION

Technical Field

The present invention relates to a shut-off valve, a vacuum pump system, and a vacuum pump.

Background Art

In the field of, e.g., a semiconductor manufacturing device, there has been used a turbo-molecular pump which is one type of vacuum pumps generating high-vacuum atmosphere (see, e.g., JP-A-2013-167207). In the turbo-molecular pump, a rotor is arranged in a housing, and a turbo-molecular pump portion is provided above the rotor. Rotor blades are arranged on the rotor side, and stator blades are arranged on the housing side. The plural stages of rotor blades and the plural stages of stator blades are alternately arranged with a clearance of several mm. A drag pump portion is provided below the rotor.

Upon pumping, the rotor rotates with a rotation speed of several tens of thousands rpm in a state of being magnetically levitated. Gas to be discharged flows from a pumping target space to a suction port of the vacuum pump. Then, the gas is compressed by the turbo-molecular pump portion and the drag pump portion, and is discharged to an exhaust port side.

In a case where atmospheric air suddenly enters the pump due to a trouble during operation of such a turbo-molecular pump (in the case of atmospheric air entry), the magnetically-levitated rotor contacts a bearing, and is rapidly decelerated. As a result, the bearing is abraded, and for this reason, breakdown of the bearing and damage of the rotor due to such breakdown may be caused if the atmospheric air entry repeatedly occurs.

Thus, JP-A-2013-167207 has proposed a shut-off valve configured to prevent the flow of atmospheric air into the vacuum pump if the atmospheric air entry occurs.

SUMMARY OF THE INVENTION

However, the shut-off valve described in JP-A-2013-167207 is configured such that a valve element itself is pushed by atmospheric air and is closed accordingly. For this reason, the atmospheric air enters the housing before the valve element is closed, and the flow of the atmospheric air into the vacuum pump cannot be sufficiently prevented.

An object of the present invention is to provide a shut-off valve, a vacuum pump system, and a vacuum pump capable of reducing the inflow of atmospheric air when atmospheric air entry occurs.

A shut-off valve according to one aspect of the present invention is a shut-off valve arranged on the downstream side with respect to an exhaust port of a vacuum pump, and includes a valve seat, a valve element, and a pressure receiving portion. The valve element is arranged on the downstream side with respect to the valve seat, and is movable so as to contact the valve seat or separate from the valve seat. The pressure receiving portion is arranged on the downstream side with respect to the valve element, and is movable to the valve seat by receiving the pressure of gas flowing back to the valve seat. The valve element is connected to the pressure receiving portion, and moves to the valve seat along with movement of the pressure receiving portion to the valve seat.

According to the above-described aspect of the present invention, the shut-off valve, the vacuum pump system, and the vacuum pump capable of reducing the inflow of atmospheric air when the atmospheric air entry occurs can be provided.

DETAILED DESCRIPTION OF THE EXEMPLARY EMBODIMENTS

Hereinafter, a vacuum pump system of an embodiment of the present disclosure will be described with reference to the drawings.

<Configuration>

(Vacuum Pump System)

Figure 1:
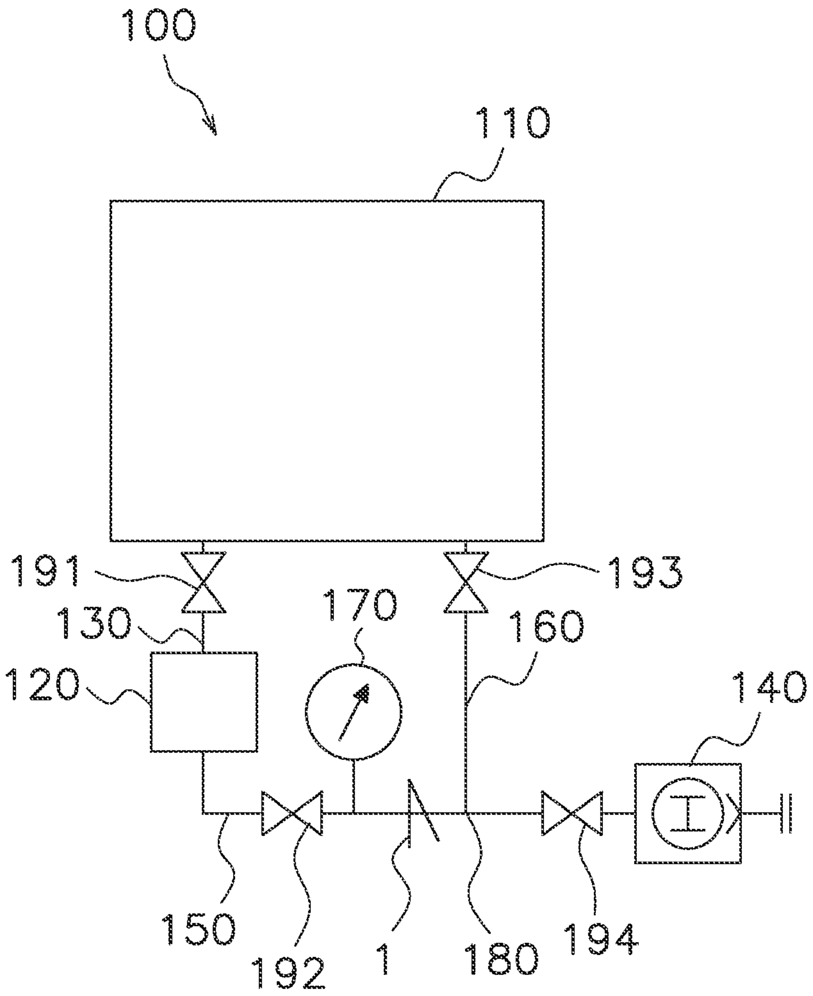
FIG. 1 is a diagram showing the configuration of a vacuum pump system of an embodiment according to the present invention.

FIG. 1 is a diagram showing the configuration of a vacuum pump system 100 according to a first embodiment. The vacuum pump system 100 has a chamber 110, a vacuum pump 120, a suction flow path 130, an auxiliary pump 140, an exhaust flow path 150, a bypass flow path 160, a vacuum gauge 170, and a shut-off valve 1.

The chamber 110 is provided, for example, in a semiconductor manufacturing device. Gas in the chamber 110 is discharged. The vacuum pump 120 is connected to the chamber 110. Gas in the chamber 110 is discharged by the vacuum pump 120. The suction flow path 130 connects the chamber 110 and the vacuum pump 120 to each other. The suction flow path 130 is a flow path in which gas in the chamber 110 is sucked into the vacuum pump 120.

The auxiliary pump 140 is arranged on the downstream side with respect to the vacuum pump 120 in a direction of discharging gas from the chamber 110. The auxiliary pump 140 is, for example, a vacuum pump. The exhaust flow path 150 connects the vacuum pump 120 and the auxiliary pump 140 to each other. The exhaust flow path 150 is a flow path in which gas is discharged from the vacuum pump 120. The bypass flow path 160 connects the chamber 110 and the exhaust flow path 150 to each other. The bypass flow path 160 is a flow path extending from the chamber 110 to the auxiliary pump 140 so as to bypass the vacuum pump 120. A portion of the bypass flow path 160 joined to the exhaust flow path 150 is shown as a joint portion 180. The vacuum gauge 170 measures the pressure of gas flowing in the exhaust flow path 150. The vacuum gauge 170 is arranged on the upstream side with respect to the joint portion 180 on the exhaust flow path 150. The shut-off valve 1 is arranged on the exhaust flow path 150. The shut-off valve 1 is arranged between the vacuum gauge 170 and the joint portion 180. The shut-off valve 1 is normally in a state of opening the flow path, and in a case where atmospheric air entry occurs, shuts off the flow path to reduce the flow of atmospheric air into the vacuum pump 120.

The vacuum pump system 100 further has on-off valves 191 to 194. Each of the on-off valves 191 to 194 opens or shuts off the flow path. The on-off valve 191 is arranged on the suction flow path 130. The on-off valve 192 is arranged between the vacuum pump 120 and the vacuum gauge 170 on the exhaust flow path 150. The on-off valve 193 is arranged on the bypass flow path 160. The on-off valve 194 is arranged between the joint portion 180 and the auxiliary pump 140 on the exhaust flow path 150.

(Vacuum Pump 120)

Figure 2:
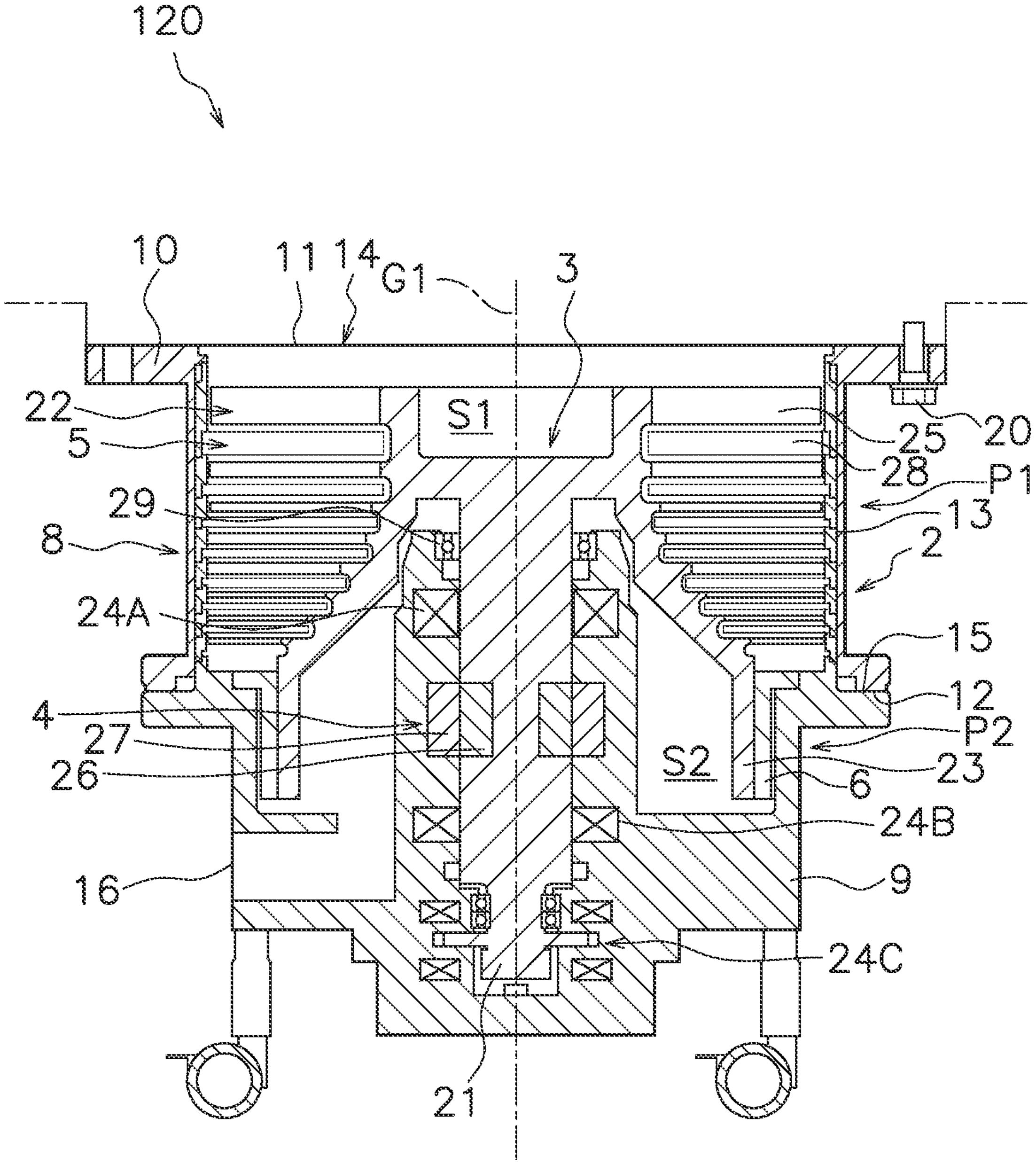
FIG. 2 is a view showing the configuration of a vacuum pump of the embodiment according to the present invention.

FIG. 2 is a sectional view of the vacuum pump 120 according to the embodiment.

The vacuum pump 120 includes a turbine portion P1 and a drag pump portion P2. The turbine portion P1 forms a turbo-molecular pump. The drag pump portion P2 forms a screw groove pump. The vacuum pump 120 is connected to the chamber 110. Gas from the chamber 110 is discharged by the turbine portion P1, and thereafter, is discharged by the drag pump portion P2. Then, the gas is discharged to the outside of the vacuum pump 120.

As shown in FIG. 2, the vacuum pump 120 has a housing 2, a rotor 3, a motor 4, a plurality of stator blade units 5, and a stator cylindrical portion 6. The housing 2 houses the rotor 3, the motor 4, the plurality of stator blade units 5, and the stator cylindrical portion 6.

(Housing 2)

The housing 2 has a case 8, a base 9, and a fixed flange 10. The housing 2 is made of metal such as aluminum alloy or iron. The case 8 is a tubular member having the fixed flange 10 at one end.

The case 8 houses the plurality of stator blade units 5 and plural stages of rotor blade units 22 provided at the rotor 3. The case 8 has a first end portion 11, a second end portion 12, and a side surface portion 13.

The first end portion 11 is attached to a pumping target device. A suction port 14 is provided at the first end portion 11. The second end portion 12 is positioned on the side opposite to the fixed flange 10 in the axial direction G1 of the rotor 3. The second end portion 12 is connected to the base 9. The side surface portion 13 connects the first end portion 11 and the second end portion 12 to each other. A first internal space S1 is formed inside the case 8.

The base 9 is arranged so as to close an opening of the case 8 on the second end portion 12 side. The base 9 houses the stator cylindrical portion 6 and a rotor cylindrical portion 23 provided at the rotor 3. The base 9 has a base end portion 15 and an exhaust port 16. The base end portion 15 is connected to the second end portion 12 of the case 8. A second internal space S2 is formed inside the base 9. The second internal space S2 communicates with the first internal space S1. The exhaust port 16 communicates with the second internal space S2.

The fixed flange 10 is connected to the case 8. The fixed flange 10 protrudes from the case 8. The fixed flange 10 is fixed to the pumping target device with a bolt 20. Note that "connection" includes joint of separate members. Further, "connection" includes continuation of separate portions of an integrated member.

(Rotor 3)

The rotor 3 has a shaft 21, the plural stages of rotor blade units 22, and the rotor cylindrical portion 23.

The shaft 21 extends in the axial direction G1 of the rotor 3. In description below, in the axial direction G1, a direction from the case 8 to the base 9 will be defined as lower, and the opposite direction of the above-described direction will be defined as upper.

The vacuum pump 120 includes a protective bearing 29 and a plurality of bearings 24A to 24C. The protective bearing 29 functions as a touchdown bearing configured to limit radial runout of the upper side of the shaft 21. The protective bearing 29 is attached to the base 9. In a state in which the shaft 21 is in steady rotation, the shaft 21 and the protective bearing 29 do not contact each other. In a case where great disturbance is applied or whirling of the shaft 21 becomes greater at the time of acceleration or deceleration of rotation, the shaft 21 contacts the inner surface of an inner ring of the protective bearing 29. As the protective bearing 29, for example, a ball bearing may be used.

The plurality of bearings 24A to 24C rotatably supports the rotor 3. The plurality of bearings 24A to 24C is attached to the base 9. The plurality of bearings 24A to 24C includes, for example, magnetic bearings. Note that the plurality of bearings 24A to 24C may include other types of bearings such as a ball bearing.

The plural stages of rotor blade units 22 are each connected to the shaft 21. The plural stages of rotor blade units 22 are arranged at intervals in the axial direction G1. Each rotor blade unit 22 includes a plurality of rotor blades 25. Although not shown in the figure, the plurality of rotor blades 25 radially extends about the shaft 21. Note that in the figure, reference numerals are assigned only to one of the plural stages of rotor blade units 22 and one of the plurality of rotor blades 25 and no reference numerals are assigned to the other rotor blade units 22 and the other rotor blades 25.

The rotor cylindrical portion 23 is connected to the shaft 21. The rotor cylindrical portion 23 is arranged below the rotor blade units 22. The rotor cylindrical portion 23 is in a cylindrical shape, and extends in the axial direction G1. The rotor cylindrical portion 23 is arranged on the outer peripheral side of the shaft 21 so as to surround the shaft 21.

(Motor 4)

The motor 4 rotationally drives the rotor 3. For example, a DC brushless motor is used as the motor 4. The motor 4 has a motor rotor 26 and a motor stator 27. The motor rotor 26 is attached to the shaft 21. The motor stator 27 is attached to the base 9. The motor stator 27 is arranged so as to face the motor rotor 26.

(Plural Stages of Stator Blade Units 5)

The plural stages of stator blade units 5 are connected to the inner surface of the case 8. The plural stages of stator blade units 5 are arranged at intervals in the axial direction G1. Each of the plural stages of stator blade units 5 is arranged between adjacent ones of the plural stages of rotor blade units 22. Each stator blade unit 5 includes a plurality of stator blades 28. Although not shown in the figure, the plurality of stator blades 28 radially extends about shaft 21.

The plural stages of rotor blade units 22 and the plural stages of stator blade units 5 form the turbine portion P1 (turbo-molecular pump). Note that in the figure, reference numerals are assigned only to one of the plurality of stator blade units 5 and one of the plurality of stator blades 28 and no reference numerals are assigned to the other stator blade units 5 and the other stator blades 28.

(Stator Cylindrical Portion 6)

The stator cylindrical portion 6 is arranged outside the rotor cylindrical portion 23 in the radial direction of the rotor cylindrical portion 23. The stator cylindrical portion 6 is connected to the base 9. The stator cylindrical portion 6 is arranged so as to face the rotor cylindrical portion 23 in the radial direction of the rotor cylindrical portion 23.

The inner peripheral surface of the stator cylindrical portion 6 is provided with a spiral screw groove. The rotor cylindrical portion 23 and the stator cylindrical portion 6 form the drag pump portion P2 (screw groove pump). Note that the spiral screw grove is not necessarily provided in the inner peripheral surface of the stator cylindrical portion 6, but may be provided in the outer peripheral surface of the rotor cylindrical portion 23.

(Shut-Off Valve 1)

Figure 3:
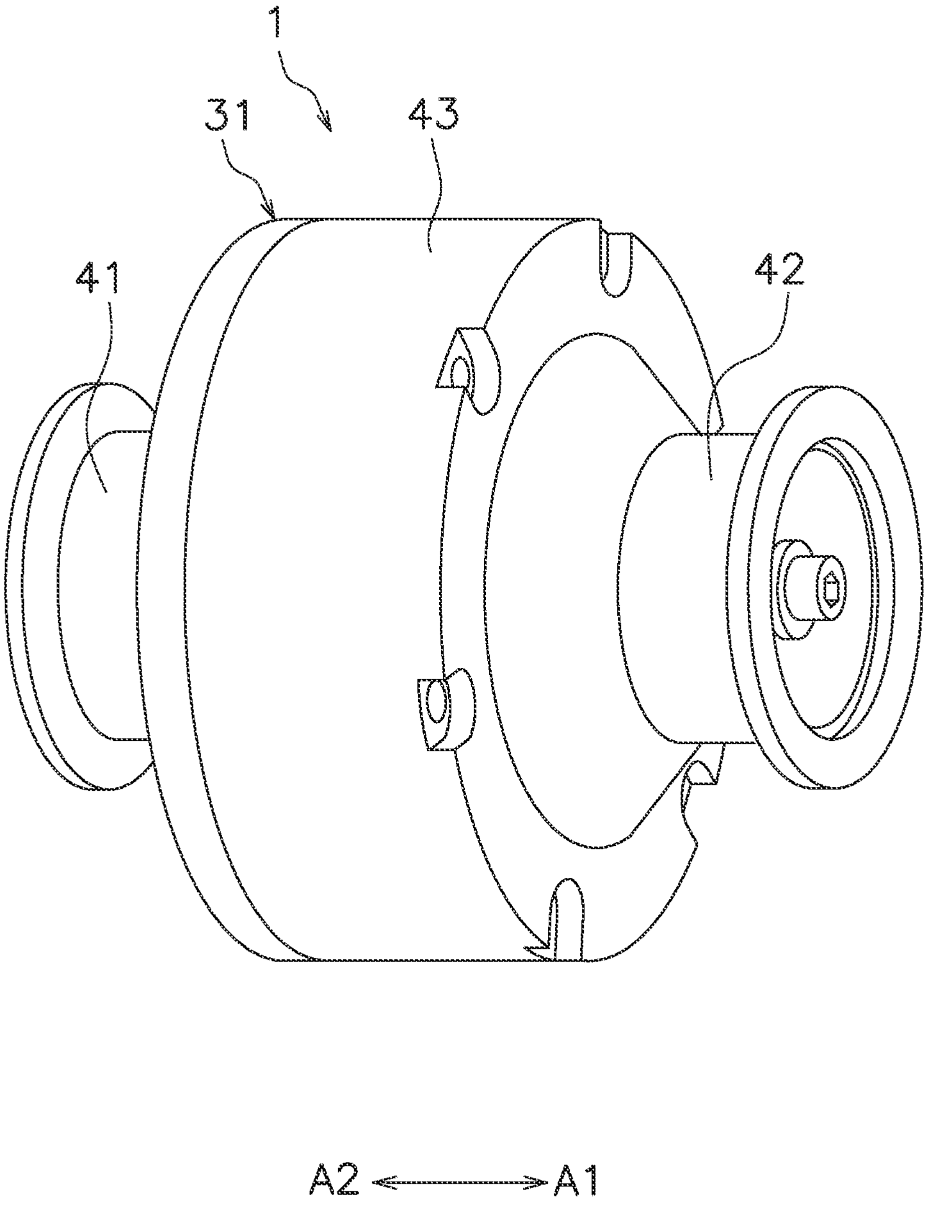
FIG. 3 is a perspective view of the appearance of a shut-off valve of the embodiment according to the present invention.
Figure 4A:
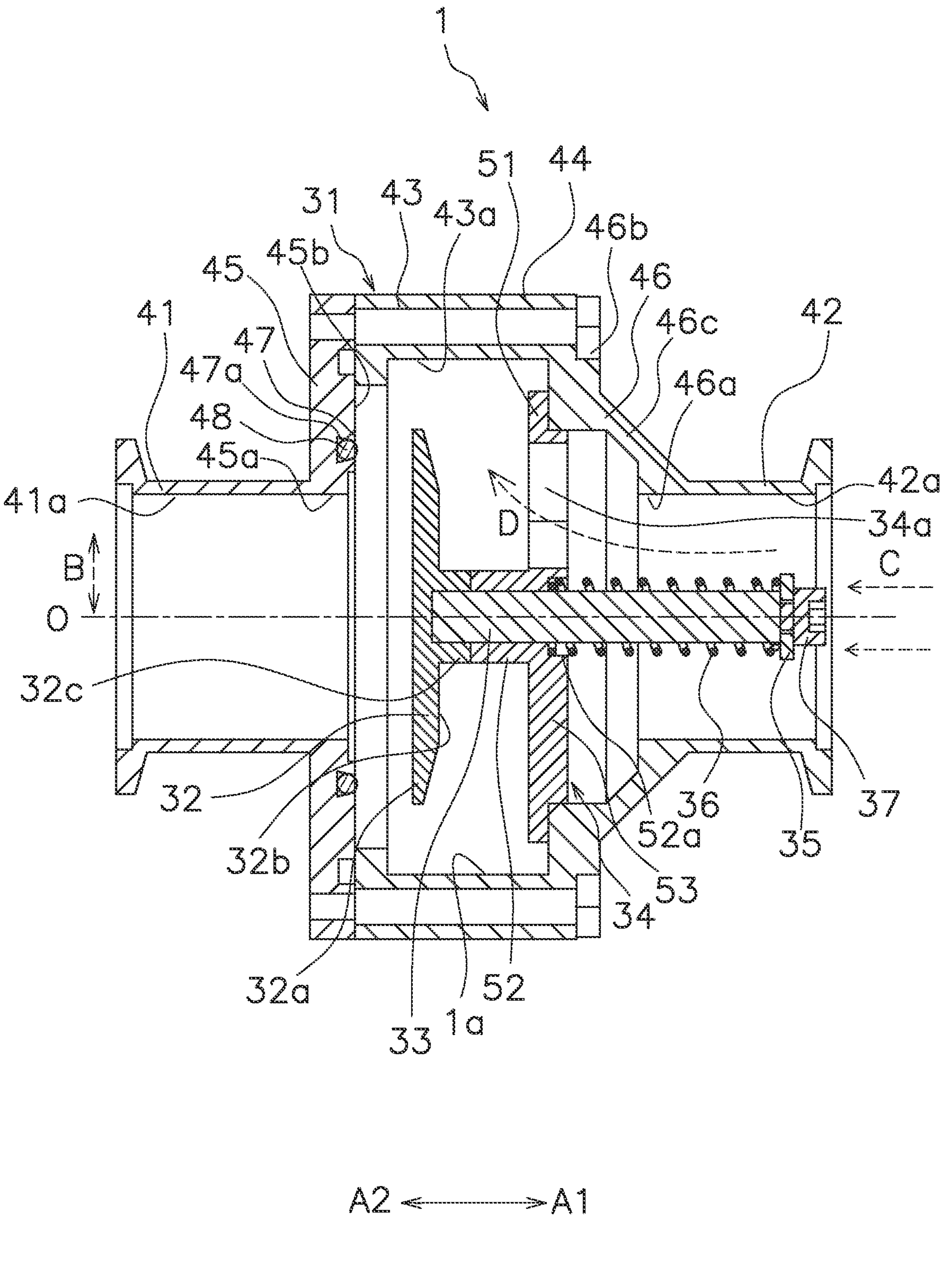
FIG. 4A is a sectional view showing a flow path open state of the shut-off valve of the embodiment according to the present invention.
Figure 4B:
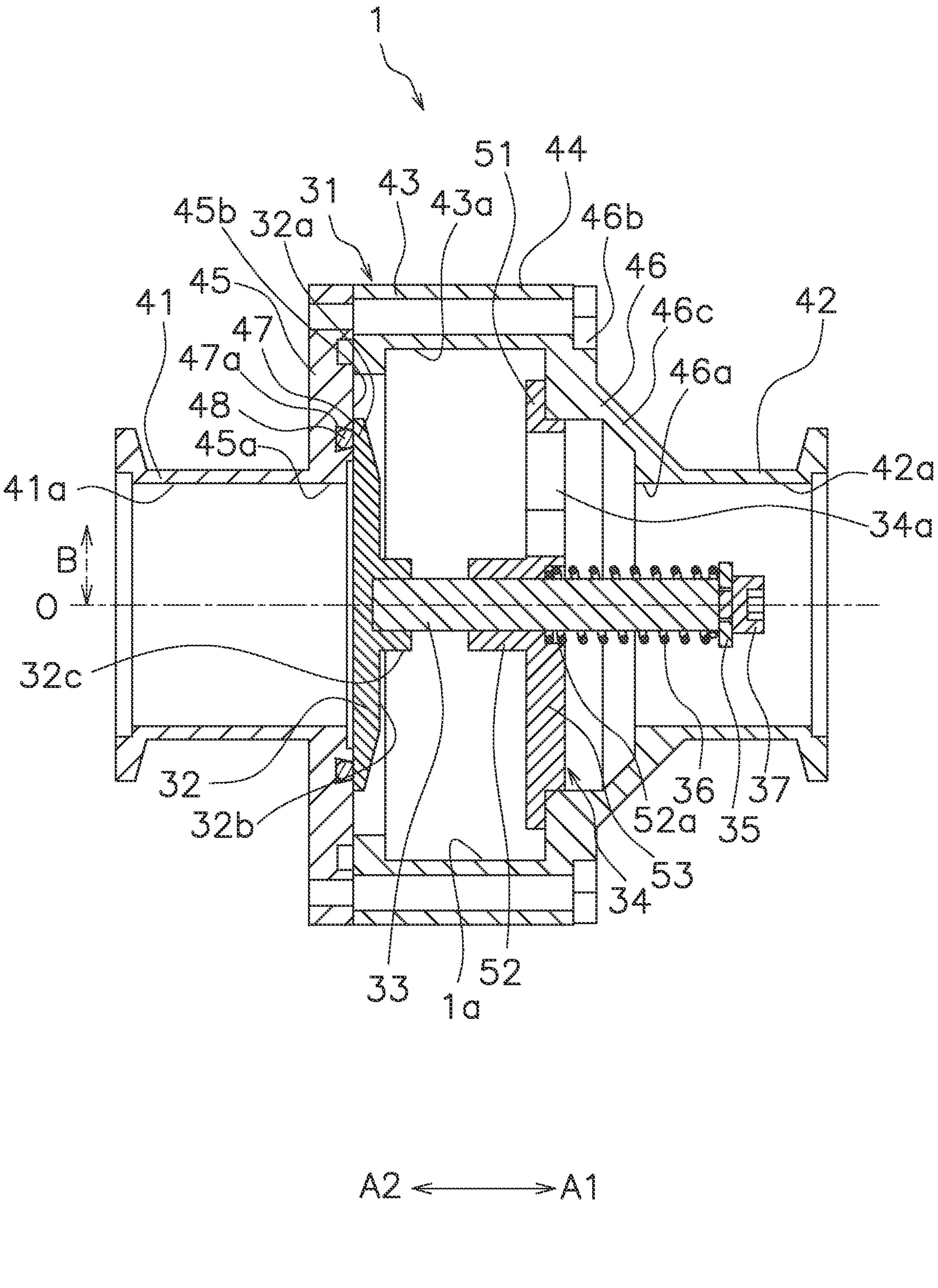
FIG. 4B is a sectional view showing a flow path closed state of the shut-off valve of the embodiment according to the present invention.
Figure 5A:
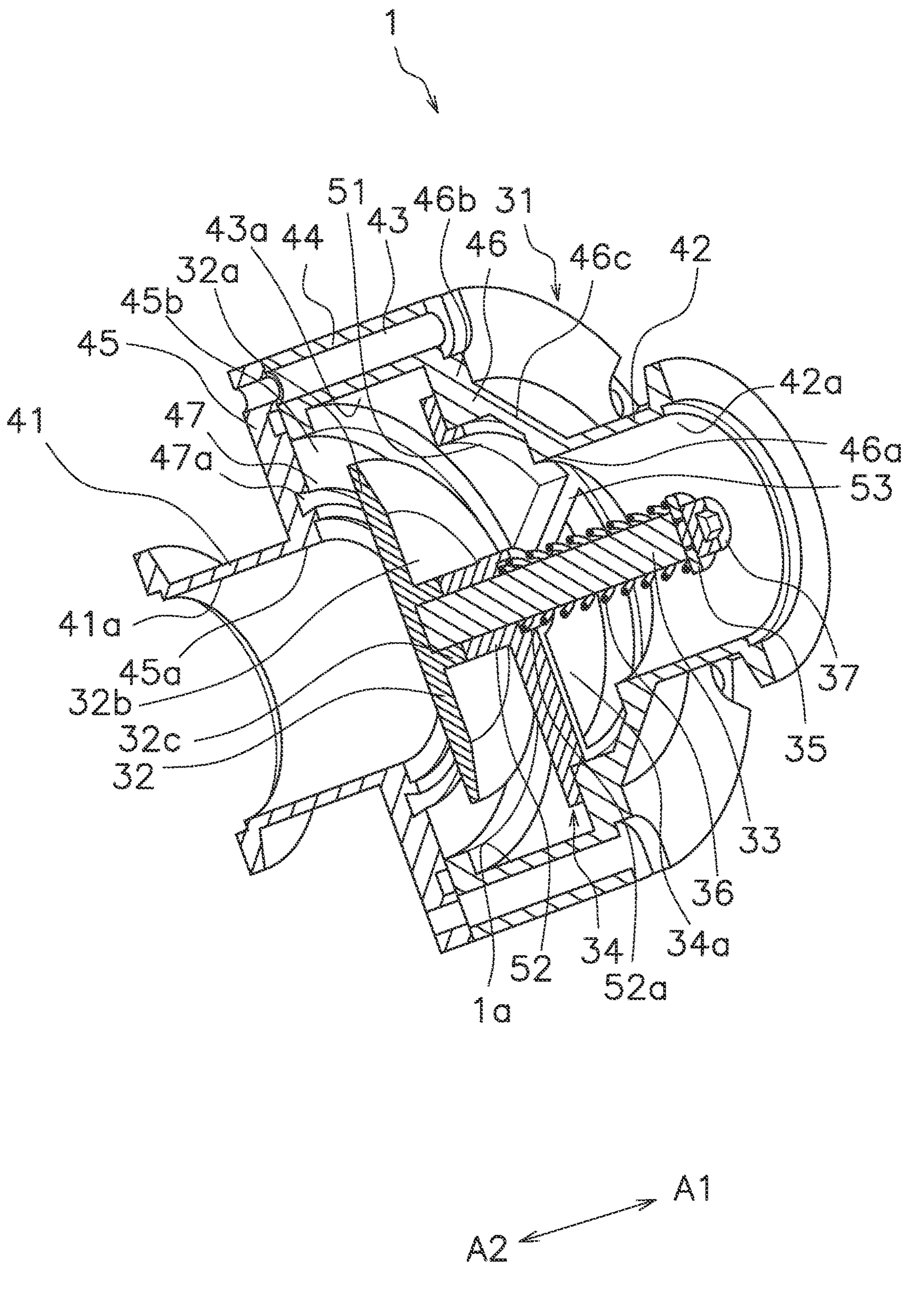
FIG. 5A is a perspective sectional view showing the flow path open state of the shut-off valve of the embodiment according to the present invention.
Figure 5B:
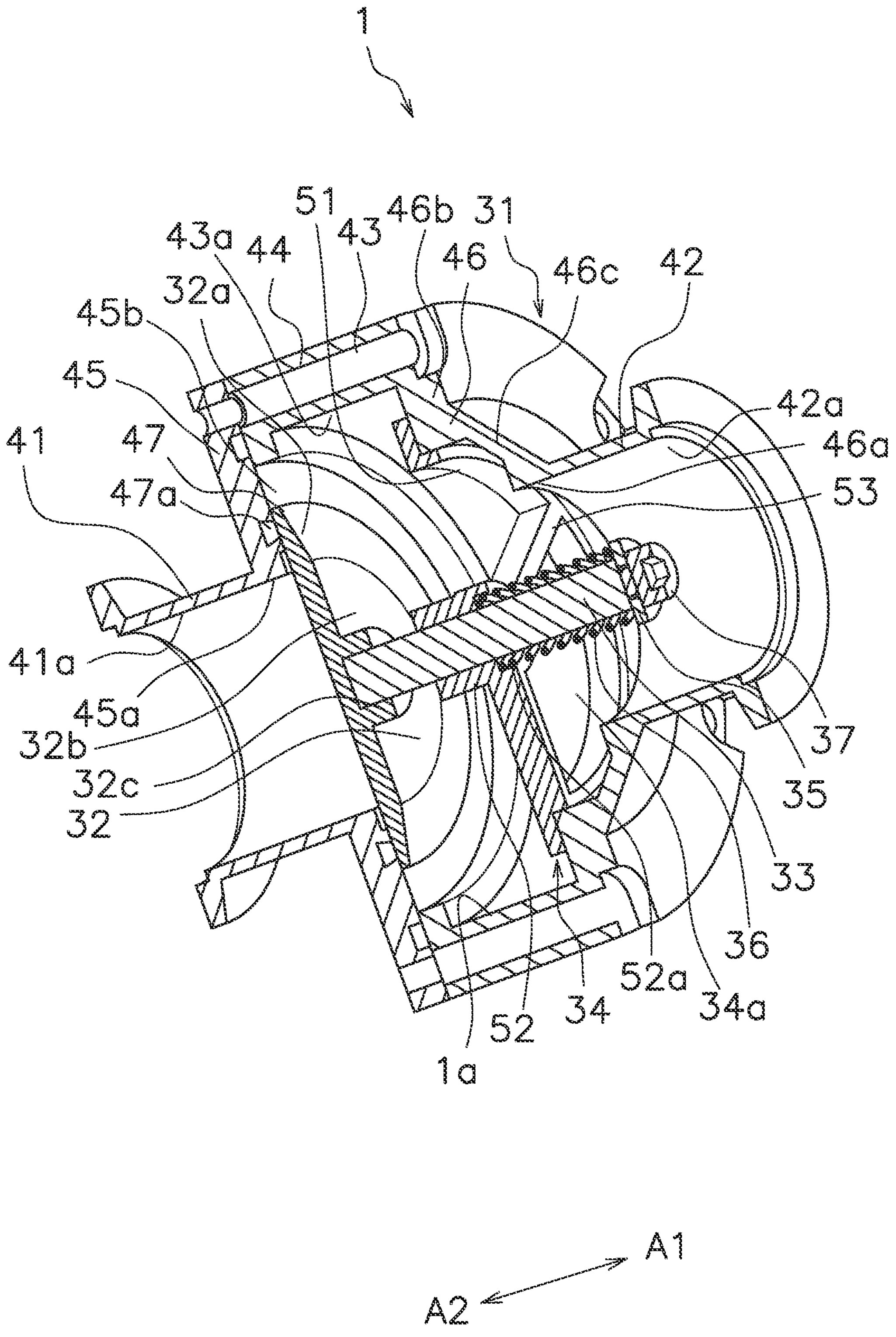
FIG. 5B is a perspective sectional view showing the flow path closed state of the shut-off valve of the embodiment according to the present invention.
Figure 6A:
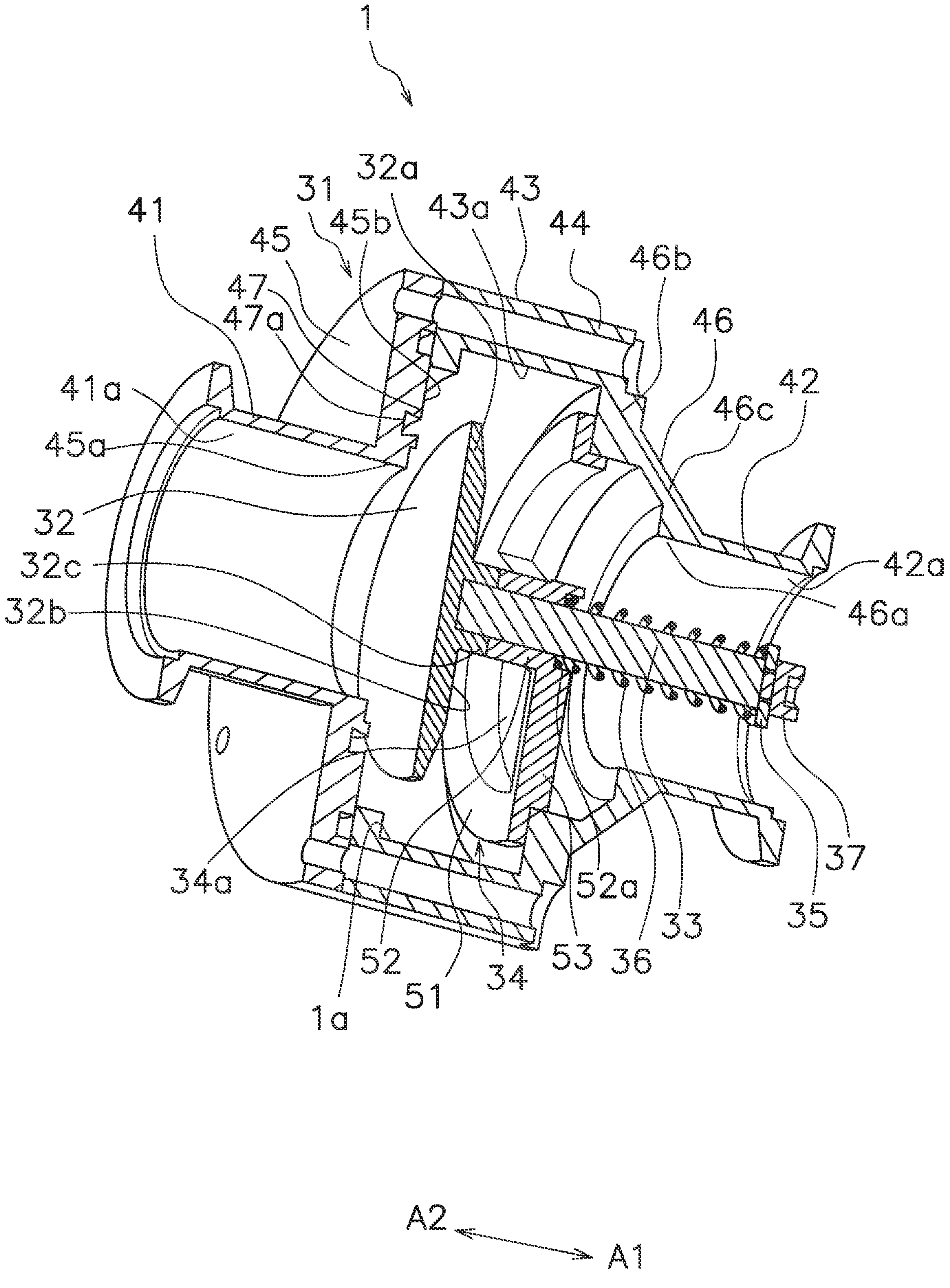
FIG. 6A is a perspective sectional view showing the flow path open state of the shut-off valve of the embodiment according to the present invention.
Figure 6B:
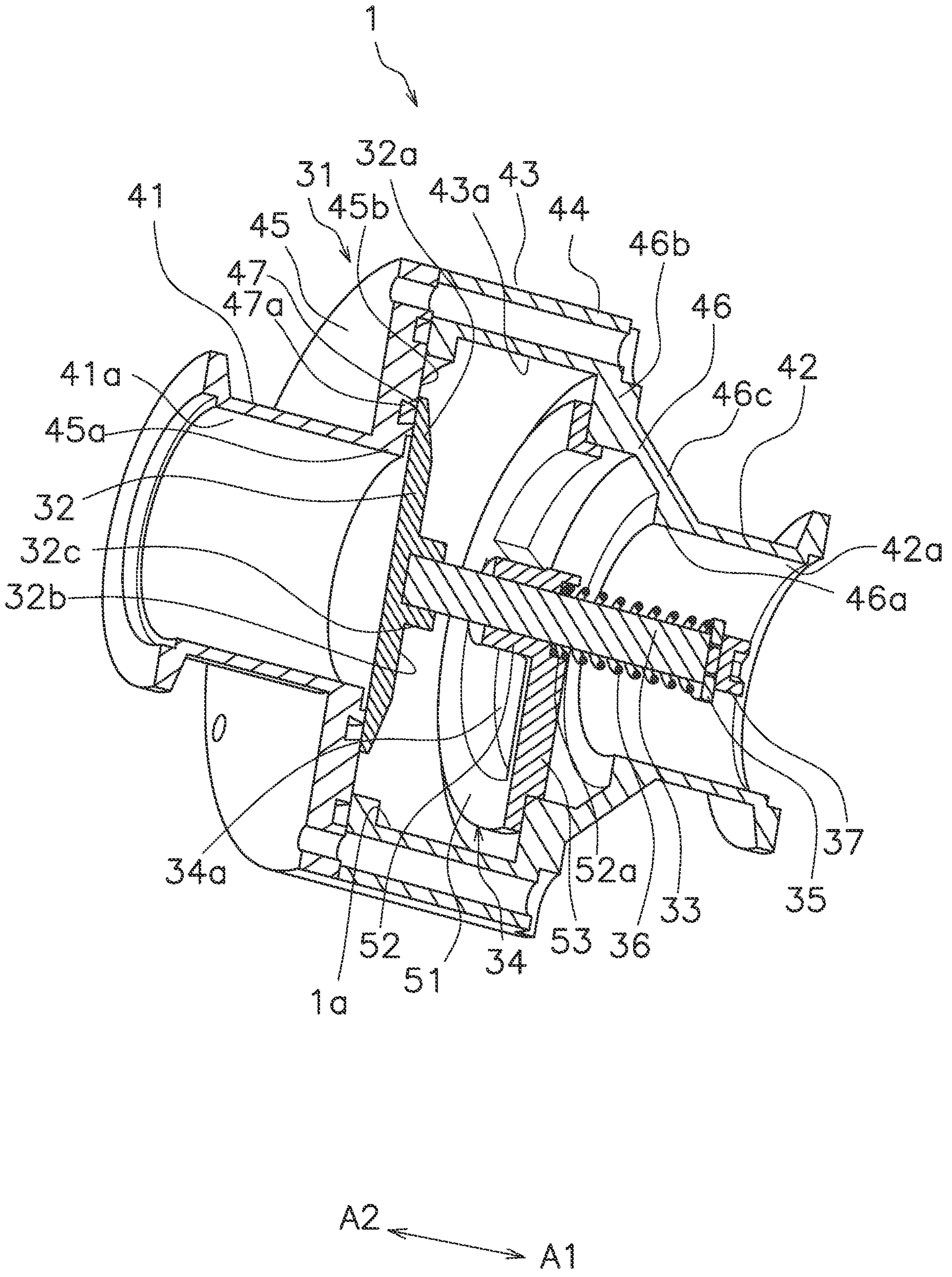
FIG. 6B is a perspective sectional view showing the flow path closed state of the shut-off valve of the embodiment according to the present invention.

FIG. 3 is a perspective view showing the appearance of the shut-off valve 1. The shut-off valve 1 is arranged in the middle of the exhaust flow path 150 shown in FIG. 1. FIG. 4A is a sectional view showing a flow path open state of the shut-off valve 1. FIG. 4B is a sectional view showing a flow path closed state of the shut-off valve 1. FIG. 5A is a perspective sectional view showing the flow path open state of the shut-off valve 1. FIG. 5B is a perspective sectional view showing the flow path closed state of the shut-off valve 1. FIG. 6A is a perspective sectional view showing the flow path open state of the shut-off valve 1 from a direction different from that in FIG. 5A. FIG. 6B is a perspective sectional view showing the flow path closed state of the shut-off valve 1 from a direction different from that in FIG. 5B. As shown in FIGS. 4A to 6B, the shut-off valve 1 has a housing 31, a valve element 32, a valve element support member 33, a support portion 34, a pressure receiving portion 35, and a spring member 36.

(Housing 31)

As shown in FIG. 3, the housing 31 has a first connection portion 41, a second connection portion 42, and a main body portion 43. The first connection portion 41 is connected to a portion of the exhaust flow path 150 on the vacuum pump 120 side. The first connection portion 41 is substantially in a cylindrical shape. As shown in FIGS. 4A and 6A, the first connection portion 41 has a first connection flow path 41*a* inside. The second connection portion 42 is connected to a portion of the exhaust flow path 150 on the joint portion 180 side. The second connection portion 42 is substantially in a cylindrical shape. As shown in FIGS. 4A and 5A, the second connection portion 42 has a second connection flow path 42*a* inside. The second connection portion 42 is arranged so as to face the first connection portion 41. The main body portion 43 is arranged between the first connection portion 41 and the second connection portion 42. When gas in the chamber 110 is discharged by drive of the vacuum pump 120, the gas flows from the first connection portion 41 to the second connection portion 42. The flow direction of the gas discharged from the chamber 110 is indicated by an arrow A1, and a backflow direction which is the direction opposite to the arrow A1 is indicated by an arrow A2. The arrow A1 side corresponds to the downstream side in the flow direction of the gas discharged from the chamber 110.

The main body portion 43 is substantially in a cylindrical shape. As shown in FIG. 3, the outer diameter of the main body portion 43 is greater than the outer diameters of the first connection portion 41 and the second connection portion 42. The center axis of the main body portion 43 is coincident with the center axis of the first connection portion 41 and the center axis of the second connection portion 42 (see a center axis O in FIG. 4A).

The main body portion 43 has a main body flow path 43*a* inside. As shown in FIG. 4A, the main body portion 43 has a peripheral surface portion 44, a first end surface portion 45, and a second end surface portion 46. The peripheral surface portion 44 is arranged along the circumferential direction about the center axis O. The first end surface portion 45 is arranged at the A2-side end of the peripheral surface portion 44. As shown in FIG. 4A, the first end surface portion 45 is formed from the A2-side end of the peripheral surface portion 44 to the center axis O. As shown in FIGS. 4A and 6A, the first end surface portion 45 is arranged substantially perpendicular to the center axis O. A first main body opening 45*a* is formed on the center axis O side in the first end surface portion 45. The first connection portion 41 protrudes from the edge of the first main body opening 45*a* to the A2 side. The main body flow path 43*a* of the main body portion 43 and the first connection flow path 41*a* of the first connection portion 41 communicate with each other through the first main body opening 45*a*. It can also be said that the first end surface portion 45 is arranged so as to connect the A2-side end of the peripheral surface portion 44 and the A1-side end of the first connection portion 41 to each other.

The second end surface portion 46 is arranged at the A1-side end of the peripheral surface portion 44. As shown in FIG. 4A, the second end surface portion 46 is formed so as to extend from the A1-side end of the peripheral surface portion 44 to the center axis O. As shown in FIGS. 4A and 5A, the second end surface portion 46 has a perpendicular portion 46*b* and an inclined portion 46*c*. The perpendicular portion 46*b* is arranged substantially perpendicular to the center axis O from the A1-side end of the peripheral surface portion 44. The inclined portion 46*c* is arranged so as to extend from the center-axis-side end of the perpendicular portion 46*b* to the center axis O. The inclined portion 46*c* is inclined so as to be positioned on the A1 side toward the center axis O. A second main body opening 46*a* is formed on the center axis O side in the inclined portion 46*c*. The second connection portion 42 protrudes from the edge of the second main body opening 46*a* to the A1 side. The main body flow path 43*a* of the main body portion 43 and the second connection flow path 42*a* of the second connection portion 42 communicate with each other through the second main body opening 46*a*. It can also be said that the second end surface portion 46 is arranged so as to connect the A1-side end of the peripheral surface portion 44 and the A2-side end of the second connection portion 42 to each other. A flow path 1*a* inside the shut-off valve 1 is formed by the first connection flow path 41$a$, the main body flow path 43$a$, and the second connection flow path 42$a$.

As shown in FIG. 4A, the first end surface portion 45 has an inner peripheral surface 45$b$ which is substantially perpendicular to the center axis O and is arranged on the A1 side. A portion of the inner peripheral surface 45$b$ at the edge of the first main body opening 45$a$ forms a valve seat 47. As shown in FIGS. 4B and 5B, the valve element 32 contacts the valve seat 47. In the present embodiment, the valve seat 47 is formed with a groove portion 47$a$, and an O-ring 48 is arranged in the groove portion 47$a$.

(Valve Element 32)

As shown in FIG. 4A, the valve element 32 is arranged on the A1 side with respect to the valve seat 47. The valve element 32 is in a discoid shape as shown in FIGS. 5A and 5B. The valve element 32 is housed in the housing 31. The valve element 32 is contactable with the valve seat 47. The valve element 32 is movable to the A2 side on which the valve element 32 contacts the valve seat 47 or to the A1 side on which the valve element 32 is separated from the valve seat 47. As shown in FIG. 4B, an outer peripheral portion 32$a$ of the valve element 32 contacts the valve seat 47, and the flow path 1$a$ of the shut-off valve 1 is closed accordingly. As shown in FIGS. 4B and 5B, the valve element 32 has a fixing portion 32$c$ arranged on an A1-side surface 32$b$. The later-described valve element support member 33 is fixed to the fixing portion 32$c$. The fixing portion 32$c$ is arranged at the center of the valve element 32. The fixing portion 32$c$ is an annular raised portion protruding from the surface 32$b$ in the A1 direction. The fixing portion 32$c$ is arranged on the center axis O.

(Valve Element Support Member 33)

As shown in FIGS. 4B and 5B, the valve element support member 33 is a circular columnar member. The valve element support member 33 is arranged along the center axis O. The valve element support member 33 is housed in the housing 31. The valve element support member 33 is fixed to the valve element 32 inside the valve seat 47 in a radial direction B. The radial direction B is a direction perpendicular to the center axis O, and includes a direction toward the center axis O and a direction away from the center axis O. The valve element support member 33 extends to the A1 side from the A1-side surface 32$b$ of the valve element 32. The valve element support member 33 is fixed to the fixing portion 32$c$ provided at the center of the valve element 32. As shown in FIG. 5B, the valve element support member 33 is inserted into the annular raised portion of the fixing portion 32$c$.

(Support Portion 34)

As shown in FIGS. 4A and 4B, the support portion 34 slidably supports the valve element support member 33 along the center axis O. The support portion 34 is fixed to the housing 31. The support portion 34 has a housing fixing portion 51, a sliding tube portion 52, and a plurality of protruding portions 53. The housing fixing portion 51 is arranged inside the housing 31. As shown in FIGS. 4B and 6B, the housing fixing portion 51 is in a circular ring shape about the center axis O. The housing fixing portion 51 is fixed to the center-axis-O-side end of the perpendicular portion 46$b$ of the second end surface portion 46. The sliding tube portion 52 has a tubular shape, and the valve element support member 33 is inserted into the sliding tube portion 52. The inner diameter of the sliding tube portion 52 is approximately the same as the outer diameter of the valve element support member 33, and the valve element support member 33 is slidable in the sliding tube portion 52. As shown in FIGS. 6A and 6B, the plurality of protruding portions 53 connects the sliding tube portion 52 and the housing fixing portion 51 to each other. Each protruding portion 53 has a rod shape. The protruding portion 53 is arranged so as to extend from the housing fixing portion 51 to the sliding tube portion 52. For example, three protruding portions 53 are arranged. The three protruding portions 53 are arranged at an interval of 120 degrees about the center axis O. As shown in FIGS. 5A and 6A, a space 34$a$ is formed between adjacent ones of the protruding portions 53, and gas flows in the space 34$a$.

As described above, the sliding tube portion 52 arranged around the valve element support member 33 is fixed to the housing fixing portion 51 fixed to the housing 31 through the plurality of protruding portions 53. With this configuration, the valve element support member 33 is slidably supported on the housing 31 by the support portion 34.

(Pressure Receiving Portion 35)

In a case where atmospheric air enters a portion on the arrow A1 side with respect to the shut-off valve 1 in the vacuum pump system 100, the pressure receiving portion 35 receives the pressure of atmospheric air toward the vacuum pump 120 and moves as indicated by the arrow A2. In FIG. 4A, the atmospheric air is indicated by arrows C. The pressure receiving portion 35 is in a discoid shape. For example, a washer may be used as the pressure receiving portion 35. The pressure receiving portion 35 is arranged substantially perpendicular to the center axis O. The pressure receiving portion 35 is fixed to the valve element support member 33. The outer diameter of the pressure receiving portion 35 is greater than the outer diameter of the valve element support member 33. The pressure receiving portion 35 is fixed to the A1-side end of the valve element support member 33 with a bolt 37. The pressure receiving portion 35 is sandwiched between the bolt 37 and the valve element support member 33. The shape of the pressure receiving portion 35 is not limited to the discoid shape, and may be in a rectangular shape as viewed along the center axis O.

(Spring Member 36)

The spring member 36 biases the valve element 32, the valve element support member 33, and the pressure receiving portion 35 to the A1 side. The spring member 36 is, for example, a coil spring. The spring member 36 is arranged around the valve element support member 33. The spring member 36 is arranged between the pressure receiving portion 35 and the sliding tube portion 52 of the support portion 34. The A1-side end of the spring member 36 contacts the pressure receiving portion 35. The A2-side end of the spring member 36 contacts the sliding tube portion 52. As shown in FIGS. 5A and 5B, the A1-side end surface of the sliding tube portion 52 is formed with a circular ring-shaped recessed portion 52$a$. The A2-side end of the spring member 36 is fitted in the recessed portion 52$a$. Movement of the spring member 36 to the A2 side is restricted by a support portion 34, and therefore, the pressure receiving portion 35 is biased to the A1 side by the biasing force of the spring member 36. The pressure receiving portion 35 is fixed to the valve element 32 through the valve element support member 33, and therefore, the valve element 32 is also biased to the A1 side by biasing of the pressure receiving portion 35 to the A1 side.

As described above, the valve element 32, the valve element support member 33, and the pressure receiving portion 35 are moved to the A1 side by the biasing force of the spring member 36, but such movement is restricted by contact of the fixing portion 32$c$ of the valve element 32 with the sliding tube portion 52 of the support portion 34 as shown in FIG. 4A. In a state in which the valve element 32, the valve element support member 33, and the pressure receiving portion 35 are moved to the A1 side by the biasing force of the spring member 36, the valve element 32 is separated from the valve seat 47, and therefore, gas flows between the valve element 32 and the valve seat 47 and the flow path 1*a* of the shut-off valve 1 is opened.

<Operation>

Next, operation of the shut-off valve 1 of the present embodiment will be described.

In a normal state in which gas is discharged from the chamber 110 by drive of the vacuum pump 120, the valve element 32, the valve element support member 33, and the pressure receiving portion 35 are moved to the A1 side by the biasing force of the spring member 36 and the flow path 1*a* of the shut-off valve 1 is opened, as shown in FIG. 4A.

In a case where atmospheric air enters the portion on the arrow A1 side with respect to the shut-off valve 1 in the vacuum pump system 100, the atmospheric air flows back from the downstream side in pumping and the pressure receiving portion 35 receives the pressure of the atmospheric air (see the arrows C in FIG. 4A).

When the pressure received by the pressure receiving portion 35 exceeds the biasing force of the spring member 36, the pressure receiving portion 35 moves to the A2 side. The valve element 32 is fixed to the pressure receiving portion 35 through the valve element support member 33. Thus, the valve element 32 also moves to the A2 side along with movement of the pressure receiving portion 35. Accordingly, the valve element 32 contacts the valve seat 47, and the flow path 1*a* of the shut-off valve 1 is closed. Thus, the flow of the atmospheric air into the vacuum pump 120 can be prevented.

As described above, in the shut-off valve 1 of the present embodiment, when the pressure receiving portion 35 receives the pressure of atmospheric air when the atmospheric air entry occurs, the atmospheric air does not reach the valve element 32, but the valve element 32 also starts moving along with movement of the pressure receiving portion 35. Before the atmospheric air moves and reaches the valve element 32 through the pressure receiving portion 35 as indicated by an arrow D in FIG. 4A, the valve element 32 starts closing along with movement of the pressure receiving portion 35. Thus, the amount of atmospheric air passing between the valve seat 47 and the valve element 32 can be reduced.

In the shut-off valve 1 of the present embodiment, the valve element 32 is supported inside (center axis O side) the valve seat 47 in the radial direction by the valve element support member 33, and therefore, the valve element 32 can be decreased in size as compared to a case where the valve element 32 is supported outside the valve seat 47. Thus, a space between the valve element 32 and the inner surface of the housing 31 can be increased in size. Accordingly, the flow path can be increased in size, and conductance can be improved. The valve element 32 is supported, at the center, only by one valve element support member 33, and is not supported at plural points as in the prior art. Thus, inclination of the valve element 32 due to component variation can be reduced.

In the vacuum pump system 100 of the present embodiment, the shut-off valve 1 is arranged between the joint portion 180 of the bypass flow path 160 and the vacuum pump 120 on the exhaust flow path 150, and therefore, even in a case where atmospheric air enters the chamber 110 or the bypass flow path 160, the flow of the atmospheric air into the vacuum pump 120 can also be reduced.

(Other Embodiments)

One embodiment of the present invention has been described above, but the present invention is not limited to the above-described embodiment and various changes can be made without departing from the gist of the invention.

Figure 7:
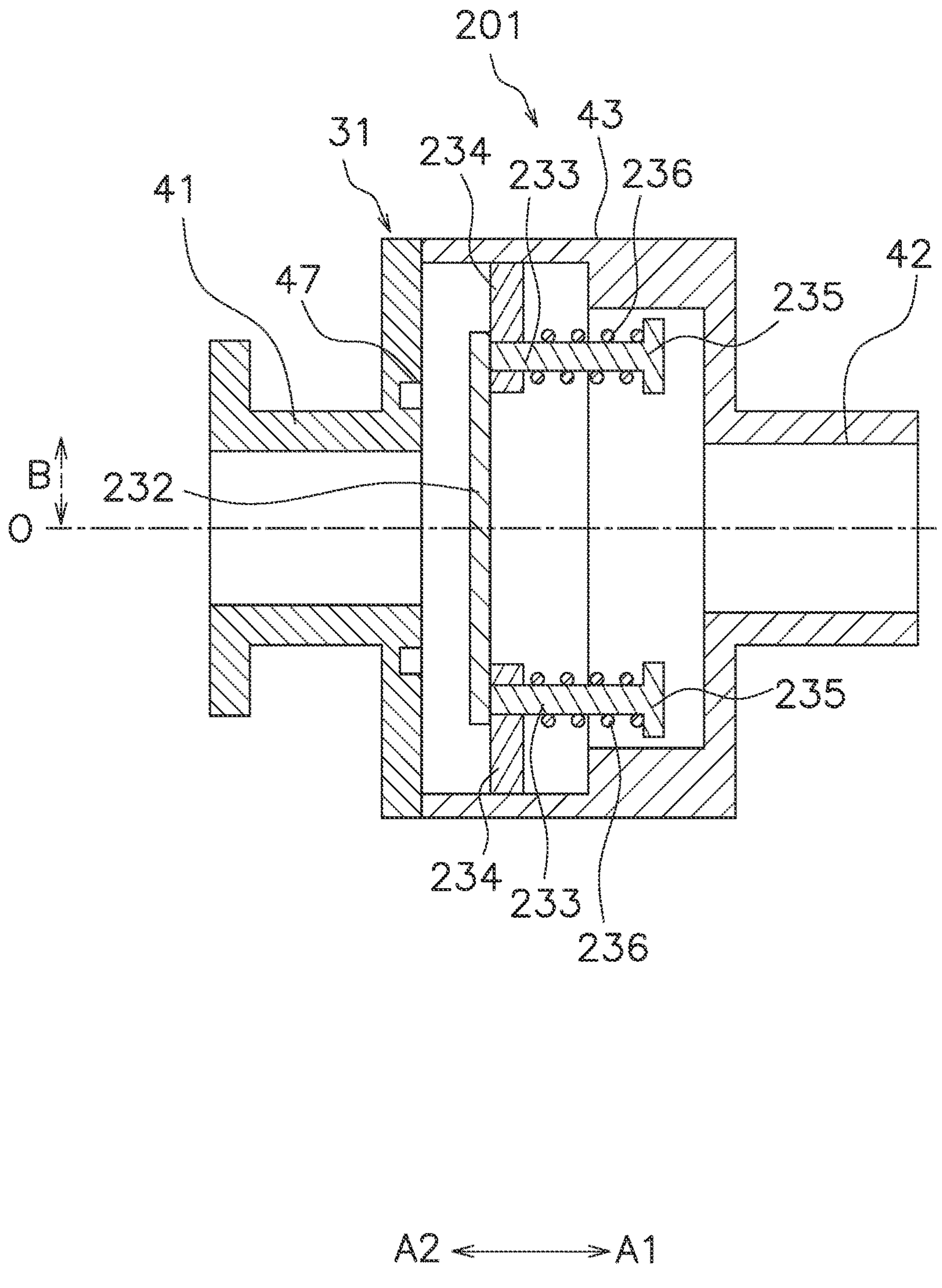
FIG. 7 is a sectional view showing the configuration of a shut-off valve of a modification of the embodiment according to the present invention.

In the above-described embodiment, the valve element 32 is supported inside the valve seat 47 by one valve element support member 33, but may be supported outside the valve seat 47 by two or more valve element support members 33. A shut-off valve 201 with such a configuration is shown in FIG. 7. In the shut-off valve 201 shown in FIG. 7, a plurality of valve element support members 233 is fixed to a portion of a valve element 232 outside the valve seat 47 in the radial direction. Each valve element support member 233 is arranged along the center axis O, and is slidably supported by a support portion 234 protruding from the inner peripheral surface of the housing 31 to the center axis O. The support portion 234 is formed with through-holes parallel with the center axis O, and the valve element support members 233 are inserted into the through-holes. A pressure receiving portion 235 is arranged at the A1-side end of the valve element support member 233. A spring member 236 is arranged between the support portion 234 and the pressure receiving portion 235 around the valve element support member 233.

When the pressure receiving portions 235 receive the pressure of atmospheric air when the atmospheric air entry occurs, the pressure receiving portions 235 move to the A2 side, the valve element 232 also moves to the A2 side along with movement of the pressure receiving portions 235, and the valve element 232 contacts the valve seat 47. In this manner, the flow path 1*a* of the shut-off valve 1 can be closed when the atmospheric air entry occurs.

In the above-described embodiment, one valve element support member 33 is fixed to the valve element 32 inside the valve seat 47 in the radial direction B, but two or more valve element support members 33 may be fixed to the valve element 32 inside the valve seat 47 in the radial direction B.

Figure 8:
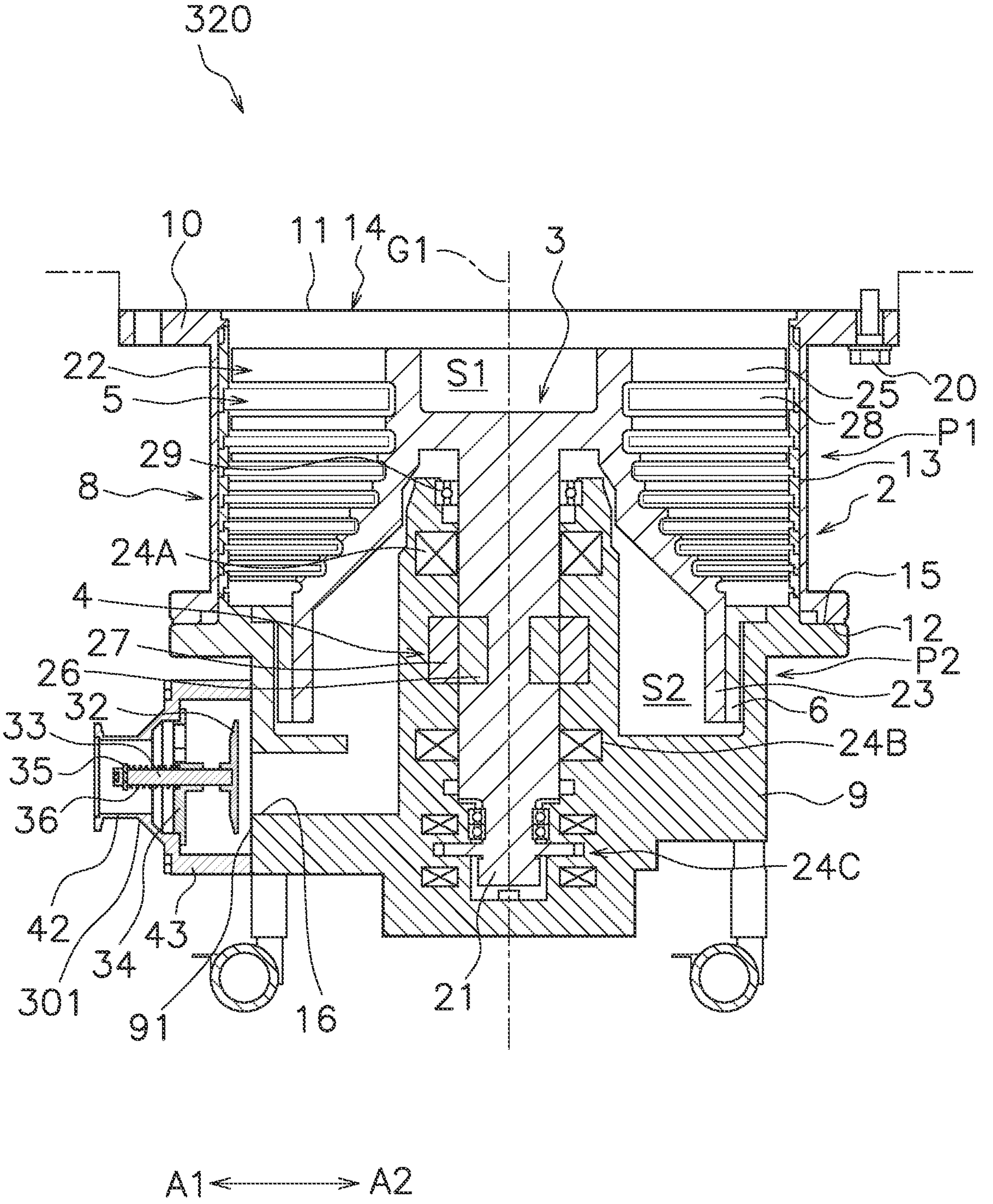
FIG. 8 is a sectional view showing the configuration of a vacuum pump of a modification of the embodiment according to the present invention.

In the above-described embodiment, the shut-off valve 1 is arranged on the flow path connected to the exhaust port 16 of the vacuum pump 120, but may be integrated with the vacuum pump 120. FIG. 8 shows a vacuum pump 320 integrated with a shut-off valve. The vacuum pump 320 includes a shut-off valve 301. The shut-off valve 301 is arranged on the downstream side with respect to the exhaust port 16 of the vacuum pump 320. Unlike the shut-off valve 1 of the above-described embodiment, the shut-off valve 301 is provided with no first connection portion 41. The shut-off valve 301 is provided with no first end surface portion 45 of the main body portion 43 as described above in the embodiment, and the base 9 also serves as the first end surface portion 45. Moreover, a peripheral edge portion 91 of the exhaust port 16 of the base 9 forms a valve seat with which the valve element 32 is to contact. Note that although not shown in the figure, the peripheral edge portion 91 may be formed with a circular ring-shaped groove portion, and an O-ring may be arranged in the circular ring-shaped groove portion.

In the above-described embodiment, the valve seat 47 is formed with the groove portion 47*a*, and the O-ring 48 is arranged in the groove portion 47*a*. However, as long as a portion between the valve seat 47 and the valve element 32 is sealed, the groove portion 47*a* and the O-ring 48 are not necessarily provided.

(Aspects)

Those skilled in the art understand that the above-described plural exemplary embodiments are specific examples of the following aspects.

(First Aspect) A shut-off valve is a shut-off valve arranged on the downstream side with respect to an exhaust port of a vacuum pump, and includes a valve seat, a valve element, and a pressure receiving portion. The valve element is arranged on the downstream side with respect to the valve seat, and is movable so as to contact the valve seat or separate from the valve seat. The pressure receiving portion is arranged on the downstream side with respect to the valve element, and is movable to the valve seat by receiving the pressure of gas flowing back to the valve seat. The valve element is connected to the pressure receiving portion, and moves to the valve seat along with movement of the pressure receiving portion to the valve seat.

In the shut-off valve according to the first aspect, the pressure receiving portion receives, before the valve element, the pressure of inflow atmospheric air in a case where the atmospheric air enters the downstream side with respect to the shut-off valve. Since the pressure receiving portion is connected to the valve element, the valve element also moves along with movement of the pressure receiving portion, and the valve element contacts the valve seat. Accordingly, the shut-off valve is closed. For example, in a case where no pressure receiving portion is provided and the shut-off valve is closed when the valve element receives the pressure of atmospheric air as in the prior art, the atmospheric air has already reached the valve element when the valve element receives the pressure of atmospheric air, and for this reason, the atmospheric air enters the vacuum pump through a portion between the valve element and the valve seat. On the other hand, in the present aspect, when the pressure receiving portion receives the pressure of atmospheric air, the atmospheric air does not reach the valve element, but the valve element also starts moving along with movement of the pressure receiving portion. Since the valve element starts moving to the valve seat in a state of the atmospheric air not reaching the valve element as described above, the flow of atmospheric air between the valve seat and the valve element can be reduced as compared to the prior art.

(Second Aspect) The shut-off valve according to the first aspect further includes a valve element support member, a support portion, and a spring member. The valve element support member extends to the downstream side from the valve element, and the pressure receiving portion is fixed to the valve element support member. The support portion slidably supports the valve element support member. The spring member is arranged between the pressure receiving portion and the support portion around the valve element support member, and biases the valve element, the valve element support member, and the pressure receiving portion to the downstream side.

In the shut-off valve according to the second aspect, in a case where no atmospheric air entry occurs, the valve element is biased to the downstream side by the spring member. Thus, gas can flow between the valve seat and the valve element. On the other hand, in a case where the atmospheric air entry occurs, when the pressure of atmospheric air becomes greater than the biasing force of the spring member, the valve element moves to the valve seat together with the pressure receiving portion, and the valve seat and the valve element can be shut off from each other.

(Third Aspect) In the shut-off valve according to the second aspect, the valve element support member is arranged inside the valve seat in a radial direction.

In the shut-off valve according to the third aspect, the valve element is supported inside the valve seat by the valve element support member, and therefore, the valve element can be decreased in size as compared to a case where the valve element is supported outside the valve seat as in the prior art. Thus, a space between the valve element and the inner surface of the housing can be increased in size. Accordingly, a flow path can be increased in size, and conductance can be improved. Moreover, only one valve element support member can be arranged at the center of the valve element, and in this case, inclination of the valve element due to component variation can be reduced.

(Fourth Aspect) A vacuum pump system includes a turbo-molecular pump, an auxiliary pump, an exhaust flow path, and the shut-off valve according to any one of the first to third aspects. The turbo-molecular pump is connected to a pumping target device. The auxiliary pump is arranged on the downstream side with respect to an exhaust port of the turbo-molecular pump. The exhaust flow path connects the turbo-molecular pump and the auxiliary pump to each other. The shut-off valve is arranged on the exhaust flow path. The vacuum pump is the turbo-molecular pump.

In the vacuum pump system according to the fourth aspect, in a case where atmospheric air enters an exhaust system on the downstream side with respect to the shut-off valve, the flow of atmospheric air into the turbo-molecular pump can be reduced.

(Fifth Aspect) The vacuum pump system according to the fourth aspect further includes a bypass flow path. The bypass flow path connects the pumping target device and the exhaust flow path to each other, and bypasses the turbo-molecular pump. The shut-off valve is arranged between the turbo-molecular pump and a joint portion of the bypass flow path to the exhaust flow path.

In the vacuum pump system according to the fifth aspect, the shut-off valve is arranged between the joint portion of the bypass flow path and the turbo-molecular pump on the exhaust flow path. Thus, even in a case where atmospheric air enters the pumping target device or the bypass flow path, the flow of atmospheric air into the turbo-molecular pump can be reduced.

(Sixth Aspect) A vacuum pump includes a housing, a rotor, a suction port, an exhaust port, and a shut-off valve. The rotor is arranged in the housing. The suction port is arranged at the housing. The exhaust port is arranged at the housing. A valve seat of the shut-off valve is a portion of the housing around the exhaust port.

In the vacuum pump according to the sixth aspect, the shut-off valve is provided integrally with the housing on the downstream side with respect to the exhaust port of the housing, and therefore, the flow of atmospheric air into the housing in a case where the atmospheric air entry occurs can be reduced.

What is claimed is:

1. A shut-off valve arranged on a downstream side with respect to an exhaust port of a vacuum pump, comprising:

a valve seat;

a valve element arranged on the downstream side with respect to the valve seat and configured movable so as to contact the valve seat or separate from the valve seat;

a pressure receiving portion arranged on the downstream side with respect to the valve element and configured movable to the valve seat by receiving a pressure of gas flowing back to the valve seat;

a valve element support member which extends to the downstream side from the valve element and to which the pressure receiving portion is fixed; and a support portion slidably supporting the valve element support member, wherein the pressure receiving portion is arranged on the downstream side of the valve element support member, the valve element is connected to the pressure receiving portion, and moves to the valve seat along with movement of the pressure receiving portion, and when the pressure receiving portion receives a pressure of atmospheric air when the atmospheric air entry occurs, the atmospheric air does not reach the valve element, but the valve element also starts moving along with movement of the pressure receiving portion, when the valve element contacts with the valve seat and when the valve element is separated from the valve seat, the pressure receiving portion is arranged on the downstream side of a most downstream portion of the support portion the valve element support member penetrates the support portion, and the valve element is arranged on an upstream side of the support portion.

2. The shut-off valve according to claim 1, further comprising:

a spring member arranged between the pressure receiving portion and the support portion around the valve element support member and biasing the valve element, the valve element support member, and the pressure receiving portion to the downstream side.

3. The shut-off valve according to claim 2, wherein the valve element support member is arranged inside the valve seat in a radial direction.

4. The shut-off valve according to claim 2, wherein the pressure of the atmospheric air received by the pressure receiving portion when the atmospheric air entry occurs exceeds the biasing force of the spring member and moves the valve element towards the valve seat.

5. A vacuum pump system comprising:

a turbo-molecular pump connected to a pumping target device;

an auxiliary pump arranged on a downstream side with respect to an exhaust port of the turbo-molecular pump;

an exhaust flow path connecting the turbo-molecular pump and the auxiliary pump to each other; and the shut-off valve according to claim 1, which is arranged on the exhaust flow path, wherein the vacuum pump is the turbo-molecular pump.

6. The vacuum pump system according to claim 5, further comprising:

a bypass flow path connecting the pumping target device and the exhaust flow path to each other and bypassing the turbo-molecular pump, wherein the shut-off valve is arranged between the turbo-molecular pump and a joint portion of the bypass flow path to the exhaust flow path.

7. A vacuum pump comprising:

a housing;

a rotor arranged in the housing;

a suction port arranged at the housing;

an exhaust port arranged at the housing; and the shut-off valve according to claim 1, wherein the valve seat is a portion of the housing around the exhaust port.

* * * * *